US012529009B2

(12) United States Patent
Vockenroth et al.

(10) Patent No.: US 12,529,009 B2
(45) Date of Patent: Jan. 20, 2026

(54) CONCENTRATED FLOWABLE WASHING AGENT PREPARATION HAVING IMPROVED PROPERTIES

(71) Applicant: Henkel AG & Co. KGaA, Duesseldorf (DE)

(72) Inventors: Inga Kerstin Vockenroth, Duesseldorf (DE); Barbara Busch, Neuss (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 343 days.

(21) Appl. No.: 17/486,760

(22) Filed: Sep. 27, 2021

(65) Prior Publication Data

US 2022/0098512 A1 Mar. 31, 2022

(30) Foreign Application Priority Data

Sep. 25, 2020 (DE) ......................... 102020212092.7

(51) Int. Cl.

| | |
|---|---|
| ***C11D 1/29*** | (2006.01) |
| ***C11D 1/40*** | (2006.01) |
| ***C11D 1/62*** | (2006.01) |
| ***C11D 3/30*** | (2006.01) |
| ***C11D 3/36*** | (2006.01) |
| ***C11D 3/37*** | (2006.01) |
| ***C11D 17/04*** | (2006.01) |

(52) U.S. Cl.

CPC .................. *C11D 1/29* (2013.01); *C11D 1/40* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 7,875,583 B2 | 1/2011 | Sarcinelli et al. | | |
| 2014/0349907 A1* | 11/2014 | Frankenbach | C11D 1/83 | 510/321 |
| 2015/0275135 A1* | 10/2015 | Si | C08F 220/56 | 526/263 |
| 2015/0275136 A1* | 10/2015 | Si | C11D 3/3769 | 526/263 |
| 2015/0376552 A1* | 12/2015 | Si | C11D 3/3773 | 510/357 |
| 2016/0040105 A1* | 2/2016 | Depoot | C11D 3/227 | 510/296 |
| 2017/0066997 A1* | 3/2017 | Chen | C11D 3/3769 | |
| 2017/0335246 A1 | 11/2017 | Applegate et al. | | |
| 2018/0179477 A1* | 6/2018 | Ure | C11D 1/722 | |
| 2018/0360706 A1 | 12/2018 | Dihora et al. | | |
| 2019/0093054 A1 | 3/2019 | Patterson et al. | | |
| 2021/0395655 A1* | 12/2021 | DePoot | C11D 3/225 | |
| 2022/0389143 A1* | 12/2022 | Mueller | C08F 283/06 | |
| 2022/0403107 A1* | 12/2022 | Ebert | C08G 65/2624 | |
| 2023/0250365 A1* | 8/2023 | Hulskotter | C11D 3/349 | 510/276 |

FOREIGN PATENT DOCUMENTS

| | | |
|---|---|---|
| EP | 3342849 A1 | 7/2018 |
| WO | 2014190131 A1 | 11/2014 |
| WO | 2020064497 A1 | 4/2020 |

OTHER PUBLICATIONS

European Search Report EP 21191239.9-1105 Completed Date: Jan. 25, 2022 Mailing Date: Feb. 2, 2022 7 Pages.

German Search Report DE 102020212092.7 Mailing Date: May 4, 2021 7 Pages.

* cited by examiner

*Primary Examiner* — Lorna M Douyon

(74) *Attorney, Agent, or Firm* — Bojuan Deng

(57) ABSTRACT

A flowable washing agent preparation containing, based on its total weight, a) 2 to 7 wt. % quaternized ethoxysulfated hexamethylenediamine; b) 2 to 7 wt. % polyalkoxylated polyalkyleneimine obtainable by reacting polyalkyleneimines with alkylene oxides; c) 5 to 15 wt. % alkyl ether sulfate; and d) less than 20 wt. % water, wherein the weight ratio of quaternized ethoxysulfated hexamethylenediamine to polyalkoxylated polyalkyleneimine is 2:1 to 1:2, and a textile washing method using these washing agent preparations.

15 Claims, No Drawings

CONCENTRATED FLOWABLE WASHING AGENT PREPARATION HAVING IMPROVED PROPERTIES

FIELD OF THE INVENTION

The present invention relates to a surfactant- and polymer-based highly concentrated washing agent preparation. The application also relates to washing agent portion units which comprise this washing agent preparation and to a method for washing textiles using the washing agent preparation or the washing agent portion unit.

BACKGROUND OF THE INVENTION

Continuously changing requirements are placed on the forms in which washing and cleaning agents are packaged and sold. For some time, the consumer has paid special attention to the easy dosing of washing and cleaning agents and the simplification of the operational steps required to carry out a washing or cleaning process. A technical solution is provided by pre-portioned washing or cleaning agents, for example film pouches having one or more receiving chambers for solid or liquid washing or cleaning agents.

A relevant trend for the production of these film pouches is the miniaturization of these film pouches. In addition to higher consumer acceptance due to simplified handling, in particular sustainability aspects, for example with regard to transport volumes, transport costs and the amount of packaging means used, are the reason behind this development.

The concentration of modern washing agents, in particular modern liquid washing agents, generally influences their optical and rheological properties, affects the storage stability of these agents and can influence their cleaning performance, in particular if the high concentration of the active ingredients leads to incompatibilities.

U.S. Pat. No. 7,875,583 B2 describes bleach-containing textile washing agents which contain quaternized ethoxysulfated hexamethylenediamine. International application WO 2020/064497 A1 describes the use of a combination of quaternized ethoxysulfated hexamethylenediamine and ethoxylated polyethyleneimine in textile washing agents.

BRIEF SUMMARY OF THE INVENTION

The problem addressed by the application was that of providing visually appealing, concentrated flowable washing agent preparations which can be produced in a simple and efficient manner, have a good shelf life and are characterized in particular by good cleaning results. In particular, the washing agent preparation should be able to be packaged in water-soluble sachets and should be based predominantly on ingredients which can be produced at least in part from renewable raw materials.

The application firstly relates to a flowable washing agent preparation containing, based on its total weight, a) 2 to 7 wt. % quaternized ethoxysulfated hexamethylenediamine;
b) 2 to 7 wt. % polyalkoxylated polyalkyleneimine obtainable by reacting polyalkyleneimines with alkylene oxides;
c) 5 to 15 wt. % alkyl ether sulfate; and
d) less than 20 wt. % water, the weight ratio of quaternized ethoxysulfated hexamethylenediamine to polyalkoxylated polyalkyleneimine being 2:1 to 1:2.

The washing agent preparation is flowable under standard conditions (20° C., 1013 mbar).

The washing agent preparation contains quaternized ethoxysulfated hexamethylenediamine in a proportion by weight of 2 to 7 wt. % as a first essential component. Due to their washing properties, particularly preferred washing agent preparations contain, based on their total weight, 2 to 5 wt. %, preferably 2 to 3 wt. %, quaternized ethoxysulfated hexamethylenediamine.

Due to their washing performance, washing agent compositions are preferred which contain a quaternized ethoxysulfated hexamethylenediamine from compounds of general formula (I)

(I)

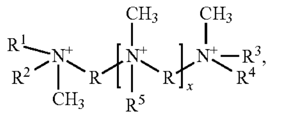

in which R represents hexyl, $R^1$, $R^2$, $R^3$, $R^4$ and $R^5$, independently of one another, represent $(-O-CH_2-CH_2)_n-SO_3M$ and $(-O-CH_2-CH_2)_n-H$, at least one of the functional groups $R^1$, $R^2$, $R^3$, $R^4$ and $R^5$ representing $(-O-CH_2-CH_2)_n-SO_3M$, M represents hydrogen or an alkali metal cation, n represents a number from 15 to 30 and x represents a number from 0 to 4.

Particularly preferred quaternized ethoxysulfated hexamethylene diamines have a weight-average molecular weight $M_w$ in the range of from 2,000 g/mol to 8,000 g/mol, preferably from 2,500 g/mol to 6,000 g/mol and in particular from 3,000 g/mol to 5,000 g/mol.

The washing agent preparation contains 1 to 7 wt. % polyalkoxylated polyalkyleneimine as a second essential component. Due to their cleaning performance, particularly preferred washing agent preparations contain, based on their total weight, 2 to 4 wt. %, preferably 2 to 3 wt. %, polyalkoxylated polyalkyleneimine.

The polyalkoxylated polyalkyleneimine is a polymer having a polyalkyleneimine backbone that carries polyalkoxy groups on the N atoms. It preferably has a weight-average molecular weight Mw in the range of from 5,000 g/mol to 60,000 g/mol, in particular from 10,000 g/mol to 22,500 g/mol. The polyalkyleneimine has primary amino functions at the ends and preferably both secondary and tertiary amino functions internally; optionally, it may also have only secondary amino functions internally, such that a linear polyalkyleneimine, and not a branched-chain polyalkyleneimine, is produced. The ratio of primary to secondary amino groups in the polyalkyleneimine is preferably in the range of from 1:0.5 to 1:1.5, in particular in the range of from 1:0.7 to 1:1. The ratio of primary to tertiary amino groups in the polyalkyleneimine is preferably in the range of from 1:0.2 to 1:1, in particular in the range of from 1:0.5 to 1:0.8. The polyalkyleneimine preferably has a weight-average molecular weight in the range of from 500 g/mol to 50,000 g/mol, in particular from 550 g/mol to 2,000 g/mol. The N atoms in the polyalkyleneimine are preferably separated from one another by alkylene groups having 2 to 12 C atoms, in particular 2 to 6 C atoms, although it is not necessary for all the alkylene groups to have the same number of C atoms. Ethylene groups, 1,2-propylene groups, 1,3-propylene groups, and mixtures thereof are particularly preferred. The primary amino functions in the polyalkyleneimine can carry 1 or 2 polyalkoxy groups and the secondary amino functions can carry 1 polyalkoxy group, although it is not necessary for every amino function to be alkoxy-group-substituted. The average number of alkoxy groups per primary and secondary amino function in the polyalkoxylated polyalkyleneimine is preferably 5 to 100, in particular 10 to 50. The alkoxy groups in the polyalkoxylated polyalkyleneimine are preferably ethoxy, propoxy or butoxy groups or mixtures thereof. Polyethoxylated polyethyleneimines are particularly preferred. The polyalkoxylated polyalkyleneimines can be obtained by reacting the polyalkyleneimines with epoxides corresponding to the alkoxy groups. If desired, the terminal OH function of at least some of the polyalkoxy substituents can be replaced by an alkyl ether function having 1 to 10, in particular 1 to 3, C atoms.

For the cleaning performance of the washing agent preparations, it has proven to be advantageous if the weight ratio of quaternized ethoxysulfated hexamethylenediamine to polyalkoxylated polyalkyleneimine is 3:2 to 2:3, preferably 4:3 to 3:4.

The washing agent preparation contains surfactant. The group of surfactants includes the non-ionic, anionic, cationic and amphoteric surfactants. The compositions according to the invention contain non-ionic surfactant and preferably one or more of the surfactants mentioned. Particularly preferred compositions contain non-ionic and anionic surfactant.

The total surfactant content of the washing agent composition is preferably 30 to 60 wt. %, more preferably 40 to 45 wt. %

The washing agent preparation contains, as an optional component, non-ionic surfactant of which the proportion by weight with respect to the total weight of the washing agent preparation is 12 to 28 wt. % and in particular 15 to 25 wt. %.

Preferred non-ionic surfactants are selected from the group of alkyl ethoxylates, in particular from the group of ethoxylated primary $C_{8-18}$ alcohols, preferably the ethoxylated primary $C_{8-18}$ alcohols having a degree of alkoxylation of ≥4, particularly preferably the $C_{12-14}$ alcohols having 4 EO or 7 EO, the $C_{9-11}$ alcohols having 7 EO, the $C_{13-15}$ alcohols having 5 EO, 7 EO or 8 EO, the $C_{13-15}$ oxo alcohols having 7 EO, the $C_{12-18}$ alcohols having 5 EO or 7 EO, very particularly preferably the $C_{12-18}$ fatty alcohols having 7 EO or the $C_{13-15}$ oxo alcohols having 7 EO.

The anionic surfactant is preferably selected from the group comprising $C_9$-$C_{13}$ alkylbenzene sulfonates, olefin sulfonates, $C_{12}$-$C_{18}$ alkane sulfonates, ester sulfonates, alk(en)yl sulfates, fatty alcohol ether sulfates and mixtures thereof. Compositions which comprise $C_9$-$C_{13}$ alkylbenzene sulfonates and fatty alcohol ether sulfates as the anionic surfactant have particularly good dispersing properties. Surfactants of the sulfonate type that can be used are preferably $C_9$-$C_{13}$ alkylbenzene sulfonates, olefin sulfonates, i.e., mixtures of alkene and hydroxyalkane sulfonates, and disulfonates, as obtained, for example, from $C_{12}$-$C_{18}$ monoolefins having a terminal or internal double bond by way of sulfonation with gaseous sulfur trioxide and subsequent alkaline or acid hydrolysis of the sulfonation products. $C_{12}$-$C_{18}$ alkane sulfonates and the esters of α-sulfo fatty acids (ester sulfonates) are also suitable, for example the α-sulfonated methyl esters of hydrogenated coconut, palm kernel or tallow fatty acids.

Fatty alcohol ether sulfates, such as the sulfuric acid monoesters of straight-chain or branched $C_7$-$C_{21}$ alcohols ethoxylated with 1 to 6 mol ethylene oxide, such as 2-methyl-branched C9-11 alcohols having, on average, 3.5 mol ethylene oxide (EO) or C12-18 fatty alcohols having 1 to 4 EO, are also suitable. Alkyl ether sulfates of formula (II) are preferred $$R^1\text{—O-(AO)}_n\text{—}SO_3^-X^+ \quad \text{(II)}$$

In this formula (II), $R^1$ represents a linear or branched, substituted or unsubstituted alkyl functional group, preferably a linear, unsubstituted alkyl functional group, particularly preferably a fatty alcohol functional group. Preferred functional groups $R^1$ of formula (II) are selected from decyl, undecyl, dodecyl, tridecyl, tetradecyl, pentadecyl, hexadecyl, heptadecyl, octadecyl, nonadecyl, eicosyl functional groups and mixtures thereof, the representatives having an even number of C atoms being preferred. Particularly preferred functional groups $R^1$ of formula (II) are derived from fatty alcohols having 12 to 18 C atoms, for example from coconut fatty alcohol, tallow fatty alcohol, lauryl alcohol, myristyl alcohol, cetyl alcohol or stearyl alcohol, or from oxo alcohols having 10 to 20 C atoms.

In formula (II), AO represents an ethylene oxide (EO) or propylene oxide (PO) group, preferably an ethylene oxide group. The index n in formula (II) is an integer from 1 to 50, preferably from 1 to 20, and in particular from 2 to 10. Very particularly preferably, n is 2, 3, 4, 5, 6, 7 or 8. X is a monovalent cation or the nth part of an n-valent cation, the alkali metal ions, including $Na^+$ or $K^+$, and the amines, being preferred in this case, with $Na^+$ and primary and secondary amines, in particular monoethanolamine, being most preferred. Further cations $X^+$ may be selected from $NH_4^+$, ½$Zn^{2+}$, ½$Mg^{2+}$, ½$Ca^{2+}$, ½$Mn^{2+}$, and mixtures thereof.

Particularly preferred compositions contain an alkyl ether sulfate selected from fatty alcohol ether sulfates of formula (II), where $R^1$=linear C12-18 alkyl, n=2, 3, 4, 5, 6, 7 or 8 and $X^+$=$Na^+$ or $HOCH_2CH_2NH_3^+$. Very particularly preferred representatives are Na fatty alcohol ether sulfates or monoethanolamine fatty alcohol sulfates having 12 to 18 C atoms and 2 EO ($R^1$=linear C12-18 alkyl, n=2 in formula II).

The degree of ethoxylation indicated represents a statistical average that can correspond to an integer or a fractional number for a specific product. The degrees of alkoxylation indicated represent statistical averages that can correspond to an integer or a fractional number for a specific product. Preferred alkoxylates/ethoxylates have a narrowed homolog distribution (narrow range ethoxylates, NRE).

DETAILED DESCRIPTION OF THE INVENTION

The proportion by weight of the alkyl ether sulfates with respect to the total weight of the washing agent preparation is preferably 6 to 13 wt. % and in particular 7 to 11 wt. %.

In addition to the alkyl ether sulfates described above, the washing agent preparation can contain further anionic surfactants. The group of these further surfactants includes, for example, the $C_{8-18}$ alkylbenzene sulfonates, in particular the $C_9$-$C_{13}$ alkylbenzene sulfonates, olefin sulfonates, $C_{12}$-$C_{18}$ alkane sulfonates, ester sulfonates, alk(en)yl sulfates and mixtures thereof.

The alkali salts and in particular the sodium salts of the sulfuric acid half-esters of $C_{12}$-$C_{18}$ fatty alcohols, for example from coconut fatty alcohol, tallow fatty alcohol, lauryl alcohol, myristyl alcohol, cetyl alcohol or stearyl alcohol, or of $C_{10}$-$C_{20}$ oxo alcohols and the half-esters of secondary alcohols having these chain lengths are preferred as alk(en)yl sulfates. From a washing perspective, $C_{12}$-$C_{16}$ alkyl sulfates, $C_{12}$-$C_{15}$ alkyl sulfates and $C_{14}$-$C_{15}$ alkyl sulfates are preferred. 2,3-alkyl sulfates are also suitable anionic surfactants.

The salts of the sulfuric acid half-esters of fatty alcohols having 12 to 18 C atoms, for example from coconut fatty alcohol, tallow fatty alcohol, lauryl alcohol, myristyl alcohol, cetyl alcohol or stearyl alcohol, or of the oxo alcohols having 10 to 20 C atoms and the half-esters of secondary alcohols having these chain lengths are preferred as alk(en)yl sulfates. From a washing perspective, the alkyl sulfates having 12 to 16 C atoms, alkyl sulfates having 12 to 15 C atoms and alkyl sulfates having 14 and 15 C atoms are preferred. 2,3-alkyl sulfates are also suitable anionic surfactants.

For the cleaning action of the washing agent compositions, it has surprisingly proven to be advantageous if these contain, based on their total weight, less than 10 wt. %, preferably less than 5 wt. % and in particular less than 2 wt. % $C_{8-18}$ alkylbenzene sulfonates, in particular $C_9$-$C_{13}$ alkylbenzene sulfonates. Small proportions by weight of alkylbenzene sulfonates are therefore preferred.

The use of fatty acids has proven to be advantageous for stability and cleaning performance. Preferred washing agent preparations therefore contain, based on their total weight, 4 to 12 wt. %, preferably 6 to 10 wt. %, fatty acid. Particularly preferred fatty acids are selected from the group of caprylic acid, capric acid, lauric acid, myristic acid, palmitic acid, stearic acid, oleic acid, linoleic acid and mixtures thereof. In the context of the application, the fatty acids are assigned to the group of anionic surfactants.

The proportion by weight of the anionic surfactant with respect to the total weight of the washing agent preparation is preferably 10 to 40 wt. % and in particular 15 to 30 wt. %.

With regard to the rheological properties of the washing agent preparation, its processability and cleaning action, it has proven advantageous to use alkyl ether sulfate and fatty acid in a weight ratio of 2:1 to 2:1, preferably 3:2 to 2:3. For the same reasons, a weight ratio of non-ionic surfactant to anionic surfactant above 3:2, preferably above 2:1, is preferred.

Preferred washing agent preparations contain, based on its total weight, 15 to 45 wt. %, preferably 25 to 45 wt. %, solvent. The solvent can be water, organic solvents or aqueous-organic solvent systems. The use of aqueous-organic solvent systems has proven to be particularly advantageous for producibility and shelf life and is therefore particularly preferred.

In a preferred embodiment, the washing agent preparation contains, based on its total weight, 15 to 42 wt. %, preferably 20 to 40 wt. % and in particular 25 to 38 wt. %, organic solvent organic solvent.

Preferred organic solvents are selected from the group of ethanol, n-propanol, propanol, butanols, glycol, propanediol, butanediol, methylpropanediol, glycerol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, propylene-glycol-t-butyl ether, di-n-octyl ether and mixtures thereof, preferably from the group of propanediol, glycerol, ethanol, and mixtures thereof.

The water content of preferred washing agent preparations, based on their total weight, is less than 15 wt. %, preferably less than 10 wt. %.

Phosphonate is a further optional component of washing agent preparations. The proportion by weight of the phosphonate with respect to the total weight of the washing agent preparation is preferably 0.1 to 3 wt. % and in particular 0.2 to 1 wt. %.

A hydroxy alkane and/or amino alkane phosphonate is preferably used as a phosphonate compound. Among the hydroxyalkane phosphonates, 1-hydroxyethane-1,1-diphosphonate (HEDP) is of particular importance. Possible aminoalkane phosphonates preferably include ethylenediamine tetramethylene phosphonate (EDTMP), diethylenetriamine pentamethylene phosphonate (DTPMP) and the higher homologs thereof. The use of ethylene diamine tetramethylene phosphonate (EDTMP) and diethylene triamine pentamethylene phosphonate (DTPMP) is very particularly preferably selected.

Preferred washing agent preparations contain an ethoxylated polyethyleneimine. Preferred ethoxylated polyethyleneimines are non-ionic, that is to say they do not have any quaternary nitrogen atoms or ionic groups other than those which are produced as a result of protonation, influenced by a pH, of the nitrogen atoms. The ethoxylated polyethyleneimine preferably comprises a polyethyleneimine backbone which has been modified by ethoxylation, the ethoxylated polyethyleneimine having a weight-average molecular weight $M_w$ in the range of from 300 g/mol to 10,000 g/mol.

Preferred washing agent preparations contain 2 to 8 wt. %, preferably 3 to 6 wt. %, enzyme preparation as a further optional component.

In addition to the actual enzyme protein, an enzyme preparation comprises further components such as enzyme stabilizers, carrier materials or fillers. The enzyme protein usually only forms a fraction of the total weight of the enzyme preparation. Enzyme preparations that are preferably used contain between 0.1 and 40 wt. %, preferably between 0.2 and 30 wt. %, more preferably between 0.4 and 20 wt. %, and most preferably between 0.8 and 10 wt. %, of the enzyme protein. In such compositions, an enzyme stabilizer can be contained in the enzyme composition in an amount of from 0.05 to 35 wt. %, preferably from 0.05 to 10 wt. %, based on the total weight.

The protein concentration can be determined using known methods, for example the BCA method (bicinchoninic acid; 2,2'-bichinolyl-4,4'-dicarboxylic acid) or the Biuret method. The active protein concentration is determined by titrating the active centers using a suitable irreversible inhibitor (for example, phenylmethylsulfonylfluoride (PMSF) for proteases) and determining the residual activity.

As a further preferred optional component, a preferred washing agent composition comprises 0.2 to 4 wt. %, preferably 0.5 to 3 wt. %, fragrance preparation.

In addition to the actual fragrances, the fragrance preparation includes, for example, solvents, solid carrier materials or stabilizers.

A fragrance is a chemical substance that stimulates the sense of smell. In order to be able to stimulate the sense of smell, it should be possible to at least partially distribute the chemical substance in the air, i.e., the fragrance should be volatile at 25° C. at least to a small extent. If the fragrance is very volatile, the odor intensity abates quickly. At a lower volatility, however, the smell is longer-lasting, i.e., it does not disappear as quickly. In one embodiment, the fragrance therefore has a melting point in the range of from −100° C. to 100° C., preferably from −80° C. to 80° C., more preferably from −20° C. to 50° C., in particular from −30° C. to 20° C. In another embodiment, the fragrance has a boiling point in the range of from 25° C. to 400° C., preferably from 50° C. to 380° C., more preferably from 75° C. to 350° C., in particular from 100° C. to 330° C.

Overall, in order to act as a fragrance, a chemical substance should not exceed a certain molecular mass since, if the molecular mass is too high, the required volatility can no longer be ensured. In one embodiment, the fragrance has a molecular mass of from 40 to 700 g/mol, more preferably from 60 to 400 g/mol.

The odor of a fragrance is perceived by most people as pleasant and often corresponds to the smell of, for example, flowers, fruits, spices, bark, resin, leaves, grasses, mosses and roots. Fragrances can thus also be used to overlay unpleasant odors or even to provide a non-smelling substance with a desired odor. It is possible, for example, to use individual odorant compounds, such as synthetic products of the ester, ether, aldehyde, ketone, alcohol and hydrocarbon types, as fragrances.

Preferably, mixtures of different fragrances are used, which together produce an appealing fragrance note. Such a mixture of fragrances may also be referred to as perfume or perfume oil. Perfume oils of this kind may also contain natural fragrance mixtures, such as those obtainable from plant sources.

For the prolongation of the fragrance effect, it has proven to be advantageous to encapsulate the fragrance. In a corresponding embodiment, at least some of the fragrance is used in encapsulated form (fragrance capsules), in particular in microcapsules. However, it is also possible to use the entire fragrance in encapsulated form. The microcapsules may be water-soluble and/or water-insoluble microcapsules. For example, melamine-urea-formaldehyde microcapsules, melamine-formaldehyde microcapsules, urea-formaldehyde microcapsules or starch microcapsules can be used. "Fragrance precursor" refers to compounds that release the actual fragrance only after chemical conversion/cleavage, typically by exposure to light or other environmental conditions such as pH, temperature, etc. Such compounds are often also referred to as fragrance storage substances or "pro-fragrances."

The composition of some preferred flowable washing agent preparations in which the weight ratio of quaternized ethoxysulfated hexamethylenediamine to polyalkoxylated polyalkyleneimine is 2:1 to 1:2, preferably 3:2 to 2:3 and in particular 4:3 to 3:4 can be found in the following tables (amounts given in wt. % based on the total weight of the preparation unless otherwise indicated).

| | Formula 1 | Formula 2 | Formula 3 | Formula 4 |
|---|---|---|---|---|
| Quaternized ethoxysulfated hexamethylenediamine | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Alkyl ether sulfate | 5 to 15 | 5 to 15 | 6 to 13 | 7 to 11 |
| Water | <20 | <15 | <15 | <10 |
| Misc. | to make up to 100 | to make up to 100 | to make up to 100 | to make up to 100 |

| | Formula 6 | Formula 7 | Formula 8 | Formula 9 |
|---|---|---|---|---|
| Quaternized ethoxysulfated hexamethylenediamine | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Water | <20 | <15 | <15 | <10 |
| Misc. | to make up to 100 | to make up to 100 | to make up to 100 | to make up to 100 |

| | Formula 11 | Formula 12 | Formula 13 | Formula 14 |
|---|---|---|---|---|
| Quaternized ethoxysulfated hexamethylenediamine | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Non-ionic surfactant | 12 to 28 | 12 to 28 | 12 to 28 | 15 to 25 |
| Water | <20 | <15 | <15 | <10 |
| Misc. | to make up to 100 | to make up to 100 | to make up to 100 | to make up to 100 |

| | Formula 16 | Formula 17 | Formula 18 | Formula 19 |
|---|---|---|---|---|
| Quaternized ethoxysulfated hexamethylenediamine | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Alkyl ethoxylate | 12 to 28 | 12 to 28 | 12 to 28 | 15 to 25 |
| Water | <20 | <15 | <15 | <10 |
| Misc. | to make up to 100 | to make up to 100 | to make up to 100 | to make up to 100 |

| | Formula 21 | Formula 22 | Formula 23 | Formula 24 |
|---|---|---|---|---|
| Quaternized ethoxysulfated hexamethylenediamine | 2 to 7 | 2 to 5 | 2 to 5 | 2 to 3 |

-continued

| | | | | |
|---|---|---|---|---|
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Fatty acid | 4 to 12 | 4 to 12 | 4 to 12 | 6 to 10 |
| Alkyl ethoxylate | 12 to 28 | 12 to 28 | 12 to 28 | 15 to 25 |
| Water | <20 | <15 | <15 | <10 |
| Misc. | to make up to 100 | to make up to 100 | to make up to 100 | to make up to 100 |

| | Formula 26 | Formula 27 | Formula 28 | Formula 29 |
|---|---|---|---|---|
| Quaternized ethoxysulfated hexamethylenediamine | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Fatty acid | 4 to 12 | 4 to 12 | 4 to 12 | 6 to 10 |
| Alkyl ethoxylate | 12 to 28 | 12 to 28 | 12 to 28 | 15 to 25 |
| Phosphonate | 0.1 to 3 | 0.1 to 3 | 0.1 to 3 | 0.2 to 1 |
| Water | <20 | <15 | <15 | <10 |
| Misc. | to make up to 100 | to make up to 100 | to make up to 100 | to make up to 100 |

| | Formula 31 | Formula 32 | Formula 33 | Formula 34 |
|---|---|---|---|---|
| Quaternized ethoxysulfated hexamethylenediamine | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Fatty acid | 4 to 12 | 4 to 12 | 4 to 12 | 6 to 10 |
| Alkyl ethoxylate | 12 to 28 | 12 to 28 | 12 to 28 | 15 to 25 |
| Phosphonate | 0.1 to 3 | 0.1 to 3 | 0.1 to 3 | 0.2 to 1 |
| Organic solvent | 15 to 42 | 15 to 42 | 20 to 40 | 25 to 38 |
| Water | <20 | <15 | <15 | <10 |
| Misc. | to make up to 100 | to make up to 100 | to make up to 100 | to make up to 100 |

| | Formula 36 | Formula 37 | Formula 38 | Formula 39 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Alkyl ether sulfate | 5 to 15 | 5 to 15 | 6 to 13 | 7 to 11 |
| Water | <20 | <15 | <15 | <10 |
| Misc. | to make up to 100 | to make up to 100 | to make up to 100 | to make up to 100 |

| | Formula 41 | Formula 42 | Formula 43 | Formula 44 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Water | <20 | <15 | <15 | <10 |
| Misc. | to make up to 100 | to make up to 100 | to make up to 100 | to make up to 100 |

| | Formula 46 | Formula 47 | Formula 48 | Formula 49 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Non-ionic surfactant | 12 to 28 | 12 to 28 | 12 to 28 | 15 to 25 |
| Water | <20 | <15 | <15 | <10 |
| Misc. | to make up to 100 | to make up to 100 | to make up to 100 | to make up to 100 |

| | Formula 51 | Formula 52 | Formula 53 | Formula 54 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Alkyl ethoxylate | 12 to 28 | 12 to 28 | 12 to 28 | 15 to 25 |

-continued

| | | | | |
|---|---|---|---|---|
| Water | <20 | <15 | <15 | <10 |
| Misc. | to make up to 100 | to make up to 100 | to make up to 100 | to make up to 100 |

| | Formula 56 | Formula 57 | Formula 58 | Formula 59 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Fatty acid | 4 to 12 | 4 to 12 | 4 to 12 | 6 to 10 |
| Alkyl ethoxylate | 12 to 28 | 12 to 28 | 12 to 28 | 15 to 25 |
| Water | <20 | <15 | <15 | <10 |
| Misc. | to make up to 100 | to make up to 100 | to make up to 100 | to make up to 100 |

| | Formula 61 | Formula 62 | Formula 63 | Formula 64 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Fatty acid | 4 to 12 | 4 to 12 | 4 to 12 | 6 to 10 |
| Alkyl ethoxylate | 12 to 28 | 12 to 28 | 12 to 28 | 15 to 25 |
| Phosphonate | 0.1 to 3 | 0.1 to 3 | 0.1 to 3 | 0.2 to 1 |
| Water | <20 | <15 | <15 | <10 |
| Misc. | to make up to 100 | to make up to 100 | to make up to 100 | to make up to 100 |

| | Formula 66 | Formula 67 | Formula 68 | Formula 69 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [1)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Fatty acid | 4 to 12 | 4 to 12 | 4 to 12 | 6 to 10 |
| Alkyl ethoxylate | 12 to 28 | 12 to 28 | 12 to 28 | 15 to 25 |
| Phosphonate | 0.1 to 3 | 0.1 to 3 | 0.1 to 3 | 0.2 to 1 |
| Organic solvent | 15 to 42 | 15 to 42 | 20 to 40 | 25 to 38 |
| Water | <20 | <15 | <15 | <10 |
| Misc. | to make up to 100 | to make up to 100 | to make up to 100 | to make up to 100 |

| | Formula 71 | Formula 72 | Formula 73 | Formula 74 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [3)] | 2 to 7 | 2 to 4 | 2 to 4 | 2 to 3 |
| Alkyl ether sulfate | 5 to 15 | 5 to 15 | 6 to 13 | 7 to 11 |
| Water | <20 | <15 | <15 | <10 |
| Misc. | to make up to 100 | to make up to 100 | to make up to 100 | to make up to 100 |

| | Formula 76 | Formula 77 | Formula 78 | Formula 79 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [3)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Water | <20 | <15 | <15 | <10 |
| Misc. | to make up to 100 | to make up to 100 | to make up to 100 | to make up to 100 |

| | Formula 81 | Formula 82 | Formula 83 | Formula 84 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [3)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Non-ionic surfactant | 12 to 28 | 12 to 28 | 12 to 28 | 15 to 25 |
| Water | <20 | <15 | <15 | <10 |
| Misc. | to make up to 100 | to make up to 100 | to make up to 100 | to make up to 100 |

-continued

| | Formula 86 | Formula 87 | Formula 88 | Formula 89 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [3)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Alkyl ethoxylate | 12 to 28 | 12 to 28 | 12 to 28 | 15 to 25 |
| Water | <20 | <15 | <15 | <10 |
| Misc. | to make up to 100 | to make up to 100 | to make up to 100 | to make up to 100 |

| | Formula 91 | Formula 92 | Formula 93 | Formula 94 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [3)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Fatty acid | 4 to 12 | 4 to 12 | 4 to 12 | 6 to 10 |
| Alkyl ethoxylate | 12 to 28 | 12 to 28 | 12 to 28 | 15 to 25 |
| Water | <20 | <15 | <15 | <10 |
| Misc. | to make up to 100 | to make up to 100 | to make up to 100 | to make up to 100 |

| | Formula 95 | Formula 96 | Formula 97 | Formula 98 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [3)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Fatty acid | 4 to 12 | 4 to 12 | 4 to 12 | 6 to 10 |
| Alkyl ethoxylate | 12 to 28 | 12 to 28 | 12 to 28 | 15 to 25 |
| Phosphonate | 0.1 to 3 | 0.1 to 3 | 0.1 to 3 | 0.2 to 1 |
| Water | <20 | <15 | <15 | <10 |
| Misc. | to make up to 100 | to make up to 100 | to make up to 100 | to make up to 100 |

| | Formula 101 | Formula 102 | Formula 103 | Formula 104 |
|---|---|---|---|---|
| Quaternized ethoxysulfated hexamethylenediamine [2)] | 2 to 7 | 2 to 5 | 2 to 5 | 2 to 3 |
| Polyalkoxylated polyalkyleneimine [3)] | 2 to 7 | 2 to 4 | 2 to 4 | 2 to 3 |
| Total surfactant | 30 to 60 | 30 to 60 | 30 to 60 | 40 to 45 |
| Alkyl ether sulfate | 5 to 15 | 5 to 15 | 6 to 13 | 7 to 11 |
| Fatty acid | 4 to 12 | 4 to 12 | 4 to 12 | 6 to 10 |
| Alkyl ethoxylate | 12 to 28 | 12 to 28 | 12 to 28 | 15 to 25 |
| Phosphonate | 0.1 to 3 | 0.1 to 3 | 0.1 to 3 | 0.2 to 1 |
| Organic solvent | 15 to 42 | 15 to 42 | 20 to 40 | 25 to 38 |
| Water | <20 | <15 | <15 | <10 |
| Misc. | to make up to 100 | to make up to 100 | to make up to 100 | to make up to 100 |

[1)] polyalkoxylated polyalkyleneimine obtainable by reacting polyalkyleneimines with alkylene oxides

[2)] quaternized ethoxysulfated hexamethylenediamine is selected from compounds of general formula (I)

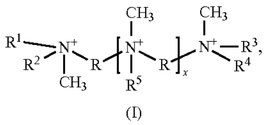

(I)

in which R represents hexyl, $R^1$, $R^2$, $R^3$, $R^4$ and $R^5$, independently of one another, represent $(-O-CH_2-CH_2)_n-SO_3M$ and $(-O-CH_2-CH_2)_n-H$, at least one of the functional groups $R^1$, $R^2$, $R^3$, $R^4$ and $R^5$ representing $(-O-CH_2-CH_2)_n-SO_3M$, M represents hydrogen or an alkali metal cation, n represents a number from 15 to 30 and x represents a number from 0 to 4.

[3)] polyethoxylated polyethyleneimine obtainable by reacting polyethyleneimines with ethylene oxide The substance systems described above are not only suitable for ensuring easy producibility as well as good shelf life and cleaning performance, but also allow a product look to be created that is attractive to the consumer. Washing agent preparations which are transparent and consequently have a low level of turbidity are perceived to be visually attractive, for example. Preferred washing agent preparations therefore have a turbidity (HACH Turbidimeter 2100Q, 20° C., 10 ml cuvette) below 100 NTU, preferably below 50 NTU and in particular below 20 NTU. At an NTU value (at 20° C.) of 60 or more, shaped bodies have a perceptible turbidity within the meaning of the invention, as can be seen with the naked eye.

Another group of washing agent preparations perceived as visually attractive are preparations having a cloudy-white appearance. The turbidity (HACH Turbidimeter 2100Q, 20° C., 10 ml cuvette) of corresponding preferred washing agent preparations is above 100 NTU and in particular above 400

NTU. Corresponding compositions preferably have an opacifier from the group of the styrene-acrylate copolymers (INCI: styrene/acrylates copolymer) and the inorganic salts, in particular from the group of the inorganic salts.

The Nephelometric Turbidity Unit (NTU) is frequently used as an indication of transparency. It is a unit, used, for example, in water treatment, for measuring turbidity, for example in liquids. It is a unit of turbidity measured using a calibrated nephelometer. High NTU values are measured for clouded compositions, whereas low values are determined for clear compositions.

The HACH Turbidimeter 2100Q from Hach Company, Loveland, Colorado (USA) is used with the calibration substances StablCal Solution HACH (20 NTU), StablCal Solution HACH (100 NTU) and StablCal Solution HACH (800 NTU), all of which can also be produced by Hach Company. The measurement is filled with the composition to be analyzed in a 10 ml measuring cuvette having a cap and is carried out at 20° C.

The optical advantages of the concentrated washing agent preparations are particularly evident in packaging means, which in turn are transparent and allow a direct view of the washing agent composition. In addition to transparent plastics bottles, transparent pouches, in particular water-soluble transparent pouches, are therefore particularly preferred for the packaging.

This application therefore further preferably relates to a washing agent portion unit comprising i) a washing agent preparation according to the invention and ii) a water-soluble film which completely encloses the washing agent preparation.

The water-soluble film in which the washing agent preparation is packaged can comprise one or more structurally different water-soluble polymer(s). Particularly suitable water-soluble polymer(s) include polymers from the group of (optionally acetalized) polyvinyl alcohols (PVAL) and the copolymers thereof.

Water-soluble films are preferably based on a polyvinyl alcohol or a polyvinyl alcohol copolymer of which the molecular weight is in the range of from 10,000 to 1,000,000 $gmol^{-1}$, preferably from 20,000 to 500,000 $gmol^{-1}$, particularly preferably from 30,000 to 100,000 $gmol^{-1}$, and in particular from 40,000 to 80,000 $gmol^{-1}$.

The production of polyvinyl alcohol and polyvinyl alcohol copolymers generally includes the hydrolysis of intermediate polyvinyl acetate. Preferred polyvinyl alcohols and polyvinyl alcohols have a degree of hydrolysis of 70 to 100 mol. %, preferably 80 to 90 mol. %, particularly preferably 81 to 89 mol. %, and in particular 82 to 88 mol. %.

Polyvinyl alcohol copolymers which include, in addition to vinyl alcohol, an ethylenically unsaturated carboxylic acid, or the salt or ester thereof, are preferred. Polyvinyl alcohol copolymers of this kind particularly preferably contain, in addition to vinyl alcohol, sulfonic acids such as 2-acrylamido-2-methyl-1-propane sulfonic acid (AMPS), acrylic acid, methacrylic acid, acrylic acid ester, methacrylic acid ester or mixtures thereof; of the esters, $C_{1-4}$ alkyl esters or $C_{1-4}$ hydroxyalkyl esters are preferred. Other suitable monomers are ethylenically unsaturated dicarboxylic acids, for example itaconic acid, maleic acid, fumaric acid and mixtures thereof.

Suitable water-soluble films for use are sold, inter alia, by MonoSol LLC, for example under the names M8630, M8720, M8310, C8400 or M8900. Films named Solublon® PT, Solublon® GA, Solublon® KC or Solublon® KL from Aicello Chemical Europe GmbH, or the VF—HP films from Kuraray, are also suitable, for example.

The water-soluble films can contain additional active ingredients or fillers, but also plasticizers and/or solvents, in particular water, as further ingredients.

The group of further active ingredients includes, for example, materials which protect the ingredients of the preparation enclosed by the film material from decomposition or deactivation by light irradiation. Antioxidants, UV absorbers and fluorescent dyes have proven to be particularly suitable for this.

Glycerol, ethylene glycol, diethylene glycol, propanediol, 2-methyl-1,3-propanediol, sorbitol or mixtures thereof, for example, can be used as plasticizers.

To reduce its coefficient of friction, the surface of the water-soluble film of the washing agent portion unit can optionally be powder-coated with fine powder. Sodium aluminosilicate, silica, talc and amylose are examples of suitable powdering agents.

Preferred water-soluble films are suitable for processing in a thermoforming apparatus.

The volume of the washing agent portion unit is preferably from 12 to 22 ml, in particular from 12 to 18 ml.

The washing agent portion unit according to one of the preceding points, the washing agent portion unit having one to four receiving chambers, preferably three or four receiving chambers. For washing agent portion units having two or more receiving chambers, preferably at least one of the receiving chambers is transparent, more preferably most of the receiving chambers are transparent.

The application also relates to a method for cleaning textiles, in which method an above-described washing agent preparation washing agent portion unit is introduced into the washing liquor of a textile washing machine.

In preferred method variants, the washing agent preparation or the washing agent portion unit is metered directly into the drum or into the dispenser drawer of the textile washing machine.

The machine textile washing method is preferably carried out at temperatures of from 20° C. to 60° C., preferably from 30° C. to 45° C.

This application relates, inter alia, to the following:

1. A flowable washing agent preparation containing, based on its total weight, a) 2 to 7 wt. % quaternized ethoxysulfated hexamethylenediamine;

b) 2 to 7 wt. % polyalkoxylated polyalkyleneimine obtainable by reacting polyalkyleneimines with alkylene oxides;

c) 5 to 15 wt. % alkyl ether sulfate; and d) less than 20 wt. % water, wherein the weight ratio of quaternized ethoxysulfated hexamethylenediamine to polyalkoxylated polyalkyleneimine is 2:1 to 1:2.

2. The washing agent preparation according to point 1, wherein the washing agent preparation contains, based on its total weight, 2 to 5 wt. %, preferably 2 to 3 wt. %, quaternized ethoxysulfated hexamethylenediamine.

3. The washing agent preparation according to one of the preceding points, wherein the quaternized ethoxysulfated hexamethylenediamine is selected from compounds of general formula (I)

(I)

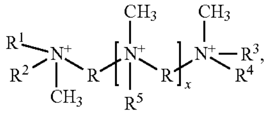

in which R represents hexyl, $R^1$, $R^2$, $R^3$, $R^4$ and $R^5$, independently of one another, represent $(—O—CH_2—CH_2)_n—SO_3M$ and $(—O—CH_2—CH_2)_n—H$, wherein at least one of the functional groups $R^1$, $R^2$, $R^3$, $R^4$ and $R^5$ represents $(—O—CH_2—CH_2)_n—SO_3M$, M represents hydrogen or an alkali metal cation, n represents a number from 15 to 30 and x represents a number from 0 to 4.

4. The washing agent preparation according to one of the preceding points, wherein the quaternized ethoxysulfated hexamethylenediamine has a weight-average molecular weight $M_w$ in the range of from 2,000 g/mol to 8,000 g/mol, preferably from 2,500 g/mol to 6,000 g/mol and in particular from 3,000 g/mol to 5,000 g/mol.
5. The washing agent preparation according to one of the preceding points, wherein the washing agent preparation contains, based on its total weight, 2 to 4 wt. %, preferably 2 to 3 wt. %, polyalkoxylated polyalkyleneimine.
6. The washing agent preparation according to one of the preceding points, wherein the polyalkoxylated polyalkyleneimine has a weight-average molecular weight $M_w$ in the range of from 5,000 g/mol to 60,000 g/mol, in particular from 10,000 g/mol to 22,500 g/mol.
7. The washing agent preparation according to one of the preceding points, wherein the washing agent preparation contains a polyethoxylated polyethyleneimine as the polyalkoxylated polyalkyleneimine.
8. The washing agent preparation according to one of the preceding points, wherein the polyalkyleneimine has primary amino groups at its ends and secondary amino groups within the molecule, and the ratio of primary to secondary amino groups in the polyalkyleneimine is in the range of from 1:0.5 to 1:1.5, in particular in range of from 1:0.7 to 1:1.
9. The washing agent preparation according to one of the preceding points, wherein the polyalkyleneimine has primary amino groups at its ends and secondary amino groups within the molecule, and the average number of alkoxy groups per primary and secondary amino function in the polyalkoxylated polyalkyleneimine is 5 to 100, in particular 10 to 50.
10. The washing agent preparation according to one of the preceding points, wherein the weight ratio of quaternized ethoxysulfated hexamethylenediamine to polyalkoxylated polyalkyleneimine is 3:2 to 2:3, preferably 4:3 to 3:4.
11. The washing agent preparation according to one of the preceding points, wherein the washing agent preparation has, based on its total weight, a total surfactant content of 30 to 60 wt. %, preferably 40 to 45 wt. %.
12. The washing agent preparation according to one of the preceding points, wherein the washing agent preparation contains, based on its total weight, 6 to 13 wt. %, preferably 7 to 11 wt. %, alkyl ether sulfate.
13. The washing agent preparation according to one of the preceding points, wherein the washing agent preparation contains, as the alkyl ether sulfate, a fatty alcohol ether sulfate, preferably a fatty alcohol ether sulfate selected from fatty alcohol ether sulfates of the formula $R^1—O-(AO)_n—SO_3^-X^+$ (II), where $R^1$=linear C12-18 alkyl, n=2, 3, 4, 5, 6, 7 or 8 and $X^+=Na^+$ or $HOCH_2CH_2NH_3^+$.
14. The washing agent preparation according to one of the preceding points, wherein the washing agent preparation contains, as the alkyl ether sulfate, a fatty alcohol ether sulfate selected from fatty alcohol ether sulfates of the formula $R^1—O-(AO)_n—SO_3^-X^+$ (II), where $R^1$=linear C12-18 alkyl, n=2, 3, 4, 5, 6, 7 or 8 and $X^+=Na^+$ or $HOCH_2CH_2NH_3^+$, in particular from the group of Na fatty alcohol ether sulfates or monoethanolamine fatty alcohol sulfates, where $R^1$=linear C12-18 alkyl and n=2.
15. The washing agent preparation according to one of the preceding points, wherein the washing agent preparation contains, based on its total weight, less than 10 wt. %, preferably less than 5 wt. %, and in particular less than 2 wt. %, $C_{8-18}$ alkylbenzene sulfonates.
16. The washing agent preparation according to one of the preceding points, wherein the washing agent preparation contains, based on its total weight, 12 to 28 wt. %, preferably 15 to 25 wt. %, non-ionic surfactant.
17. The washing agent preparation according to point 16, wherein the non-ionic surfactant is selected from the group of ethoxylated primary $C_{8-18}$ alcohols, preferably the ethoxylated primary $C_{8-18}$ alcohols having a degree of alkoxylation of ≥4, particularly preferably the $C_{12-14}$ alcohols having 4 EO or 7 EO, the $C_{9-11}$ alcohols having 7 EO, the $C_{13-15}$ alcohols having 5 EO, 7 EO or 8 EO, the $C_{13-15}$ oxo alcohols having 7 EO, the $C_{12-18}$ alcohols having 5 EO or 7 EO, in particular the $C_{12-18}$ alcohols having 7 EO or the $C_{13-15}$ alcohols having 7 EO.
18. The washing agent preparation according to one of the preceding points, wherein the washing agent preparation contains non-ionic surfactant and anionic surfactant in a weight ratio above 3:2, preferably above 2:1.
19. The washing agent preparation according to one of the preceding points, wherein the washing agent preparation contains, based on its total weight, 4 to 12 wt. %, preferably 6 to 10 wt. %, fatty acid.
20. The washing agent preparation according to point 18, wherein the fatty acid is selected from the group of caprylic acid, capric acid, lauric acid, myristic acid, palmitic acid, stearic acid, oleic acid, linoleic acid and mixtures thereof.
21. The washing agent preparation according to one of the preceding points, wherein the washing agent preparation contains alkyl ether sulfate and fatty acid in a weight ratio of 2:1 to 2:1, preferably 3:2 to 2:3.
22. The washing agent preparation according to one of the preceding points, wherein the washing agent preparation contains, based on its total weight, less than 15 wt. %, preferably less than 10 wt. %, water.
23. The washing agent preparation according to one of the preceding points, wherein the washing agent preparation contains, based on its total weight, 15 to 45 wt. %, preferably 25 to 45 wt. %, solvent.
24. The washing agent preparation according to one of the preceding points, wherein the washing agent preparation contains, based on its total weight, 15 to 42 wt. %, preferably 20 to 40 wt. % and in particular 25 to 38 wt. %, organic solvent.

25. The washing agent preparation according to point 24, wherein the organic solvent is selected from the group of ethanol, n-propanol, i-propanol, butanols, glycol, propanediol, butanediol, methylpropanediol, glycerol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, propylene-glycol-t-butyl ether, di-n-octyl ether and mixtures thereof, preferably from the group of propanediol, glycerol, ethanol, and mixtures thereof
26. The washing agent preparation according to one of the preceding points, wherein the washing agent preparation contains, based on its total weight, 0.1 to 3 wt. %, preferably 0.2 to 1 wt. %, phosphonate.
27. The washing agent preparation according to point 26, wherein the phosphonate is selected from the group of hydroxyalkane phosphonates and/or aminoalkane phosphonates, preferably from the group of aminoalkane phosphonates and in particular from the group of ethylenediamine tetramethylene phosphonate (EDTMP) and diethylenetriamine pentamethylene phosphonate (DTPMP).
28. The washing agent preparation according to one of the preceding points, wherein the washing agent preparation contains, based on its total weight, less than 2 to 8 wt. %, preferably 3 to 6 wt. %, enzyme preparation.
29. The washing agent preparation according to one of the preceding points, wherein the washing agent preparation contains, based on its total weight, 0.2 to 4 wt. %, preferably 0.5 to 3 wt. %, fragrance preparation.
30. The washing agent preparation according to one of the preceding points, wherein the washing agent preparation has a turbidity (HACH Turbidimeter 2100Q, 20° C., 10 ml cuvette) below 100 NTU, preferably below 50 NTU and in particular below 20 NTU.
32. A washing agent portion unit comprising
   i) a washing agent preparation according to one of points 1 to 30 and
   ii) a water-soluble film which completely encloses the washing agent preparation.
33. The washing agent portion unit according to point 31, wherein the washing agent portion unit has a volume of from 12 to 22 ml, preferably from 12 to 18 ml.
34. The washing agent portion unit according to one of the preceding points, wherein the washing agent portion unit has one to four receiving chambers, preferably three or four receiving chambers.
35. A method for cleaning textiles, wherein a washing agent preparation according to one of points 1 to 29 or a washing agent portion unit according to one of points 31 to 33 is introduced into the washing liquor of a textile washing machine.

Examples

Textile fabrics were provided with standardized soiling and then washed at 40° C. in washing liquors which contained 1 g/l of a washing agent C1 to C3 or E1. After washing, the textiles were dried. The brightness values of the cleaned textiles were determined. The values given were the averages from five washing tests.

TABLE 1

| Washing agent composition (wt. %) | | | | |
|---|---|---|---|---|
| | C1 | C2 | C3 | E1 |
| 1,2-propanediol | 6.0 | 6.0 | 6.0 | 6.0 |
| Glycerol | 25 | 20 | 20 | 20 |
| Ethanol | 3.2 | 3.2 | 3.2 | 3.2 |
| Water | 8.0 | 8.0 | 8.0 | 8.0 |
| Monoethanolamine | 3.5 | 3.5 | 3.5 | 3.5 |
| Na lauryl ether sulfate (2 EO) | 9.0 | 9.0 | 9.0 | 9.0 |
| Fatty acid | 9.0 | 9.0 | 9.0 | 9.0 |
| C12-18 fatty alcohol ethoxylate (7 EO) | 24 | 24 | 24 | 24 |
| Quaternized ethoxysulfated hexamethylenediamine | — | — | 5.0 | 2.5 |
| Polyalkoxylated polyalkyleneimine | — | 5.0 | — | 2.5 |
| DTPMP Na salt | 0.5 | 0.5 | 0.5 | 0.5 |
| Optical brightener | 0.5 | 0.5 | 0.5 | 0.5 |
| Perfume | 1.0 | 1.0 | 1.0 | 1.0 |
| Enzyme preparation | 3.5 | 3.5 | 3.5 | 3.5 |
| Misc. | to make up to 100 | to make up to 100 | to make up to 100 | to make up to 100 |

TABLE 2

| Brightness value differences (Y values) | | | | | |
|---|---|---|---|---|---|
| Stain | Textile | C1 | C2 | C3 | E1 |
| Salad dressing with pigment black | Cotton | 68.6 | 69.0 | 69.4 | 70.3 |
| Locust bean gum with pigment | Cotton | 64.4 | 64.5 | 63.4 | 65.2 |

What is claimed is:

1. A flowable washing agent preparation comprising, based on the total weight of the flowable washing agent:
   a. 2 to 3 wt. % quaternized ethoxysulfated hexamethylenediamine;
   b. 2 to 3 wt. % polyalkoxylated polyalkyleneimine;
   c. 7 to 11 wt. % alkyl ether sulfate;
   d. less than 10 wt. % water;
   e. 6 to 10 wt. % fatty acid;
   f. 15 to 25 wt. % alkyl ethoxylate;
   g. 0.1 to 3 wt % aminoalkane phosphonate; and
   h. 25 to 38 wt. % organic solvent.

2. The flowable washing agent of claim 1, wherein the quaternized ethoxysulfated hexamethylenediamine has the structure of general formula (I)

(I)

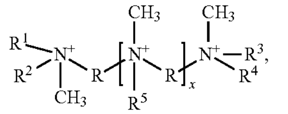

wherein R is hexyl, wherein $R^1$, $R^2$, $R^3$, $R^4$ and $R^5$, independently of one another, are selected from the group consisting of $(—O—CH_2—CH_2)_n—SO_3M$ and $(—O—CH_2—CH_2)_n$ —H, wherein at least one of the functional groups $R^1$, $R^2$, $R^3$, $R^4$ and $R^5$ is $(—O—CH_2—CH_2)_n—SO_3M$, wherein M is selected from the group consisting of hydrogen and an alkali metal cation, wherein n represents a number from 15 to 30, and wherein x represents a number from 0 to 4.

3. The flowable washing agent of claim 1, wherein the weight ratio of the quaternized ethoxysulfated hexamethylenediamine to the polyalkoxylated polyalkyleneimine is from 3:2 to 2:3.

4. The flowable washing agent of claim 3, wherein the weight ratio of the quaternized ethoxysulfated hexamethylenediamine to the polyalkoxylated polyalkyleneimine is from 4:3 to 3:4.

5. The flowable washing agent of claim 1, wherein the flowable washing agent comprises, based on the total weight of the flowable washing agent, a total surfactant content of 30 to 60 wt. %.

6. The flowable washing agent of claim 5, wherein the total surfactant content is from 40 to 45 wt. %.

7. The flowable washing agent of claim 1, wherein the average number of alkoxy groups per primary and secondary amino function in the polyalkoxylated polyalkyleneimine is from 5 to 100.

8. The flowable washing agent of claim 1, wherein the average number of alkoxy groups per primary and secondary amino function in the polyalkoxylated polyalkyleneimine is from 10 to 50.

9. The flowable washing agent of claim 1, wherein the flowable washing agent further comprises less than 5 wt. % $C_8$-$C_{18}$ alkylbenzene sulfonates.

10. The flowable washing agent of claim 1, wherein the aminoalkane phosphonate is selected from the group consisting of ethylenediamine tetramethylene phosphonate, diethylenetriamine pentamethylene phosphonate, and a combination thereof.

11. A unit dose washing product comprising:

i. the flowable washing agent of claim 1; and ii. a water-soluble film which completely encloses the flowable washing agent.

12. The unit dose washing product of claim 11, wherein the unit dose washing product has a volume of from 12 to 22 ml.

13. The unit dose washing product of claim 11, wherein the unit dose washing product has a volume of from 12 to 18 ml.

14. A method for cleaning textiles, the method comprising introducing the flowable washing agent of claim 1 into a washing liquor of a textile washing machine.

15. A method for cleaning textiles, the method comprising introducing the unit dose washing product of claim 11 into a washing liquor of a textile washing machine.

* * * * *